US005528424A

United States Patent [19]
Lentz et al.

[11] Patent Number: 5,528,424
[45] Date of Patent: Jun. 18, 1996

[54] TELEVISION LENS SHADE

[76] Inventors: Blaine Lentz, 21900 Marylee St. #262, Woodland Hills, Calif. 91367; C. Martin Smith, 10978 Ayers Ave., Los Angeles, Calif. 90064

[21] Appl. No.: 253,335

[22] Filed: Jun. 3, 1994

[51] Int. Cl.$^6$ ............................ G02B 23/16; H04N 5/17
[52] U.S. Cl. .................... 359/612; 359/601; 359/611; 348/834; 348/842
[58] Field of Search ........................ 359/601, 608–612, 359/362, 817, 227, 229; 348/834, 842; 440/101

[56] References Cited

U.S. PATENT DOCUMENTS

| | | | |
|---|---|---|---|
| 1,905,868 | 4/1933 | Hein | 359/608 |
| 3,564,138 | 2/1971 | Harbold | 348/842 |
| 4,314,280 | 2/1982 | Rose | 359/612 |
| 4,660,943 | 4/1987 | Ellis | 359/362 |
| 4,940,311 | 7/1990 | Buszek et al. | 359/817 |
| 5,069,529 | 12/1991 | Takahashi | 359/601 |
| 5,101,298 | 3/1992 | Lentz et al. | 359/612 |
| 5,181,872 | 1/1993 | Green | 440/101 |
| 5,218,474 | 6/1993 | Kirschner | 348/842 |

Primary Examiner—Thong Q. Nguyen
Attorney, Agent, or Firm—Gene Scott

[57] ABSTRACT

A camera lens shading device is disclosed having a flexible mounting band that attaches to a camera lens shroud and shade pieces, the shade pieces being made of opaque, flexible, plastic sheet material. A top shade piece attaches to the mounting band and extends outward from above the camera lens, adjustable over a range of angles. Two side shade pieces are attached to the top shade piece and are adjustable in angle to the top piece and in lateral distance therefrom for fitting a variety of camera lens shroud widths. A hinge section is formed in the top shade piece and side shade pieces for angle adjustment, whereby each piece can be adjusted independently to obtain a desired shading effect. A visor section extends forward from the top shade piece and rear screening sections extend rearward from the side shade pieces to further control the light entering the camera lens area. When dismantled, the shade apparatus is configured into an easily portable, generally flat assembly that enables the device to be stored and transported with the lens in a lens case for mobile television production.

7 Claims, 6 Drawing Sheets

TELEVISION LENS SHADE

FIELD OF THE INVENTION

This invention relates in general to camera devices. More particularly, this invention relates to camera lens shading devices.

BACKGROUND OF THE INVENTION

In the film and video industry the term "lens flare" refers to light refraction within a camera lens. Lens flare is created when strong direct light, such as sunlight, enters the camera at a peripheral angle. As lens flare is visible in the resulting camera image, it is usually an undesirable effect. As a result, several shade devices have been invented to block such peripheral light in order to reduce or eliminate lens flare.

One common shade device is an opaque collapsible bellows that mounts with rigid mounting hardware at one end to a camera or camera lens, and at the other end to a plate designed to receive various visual effects equipment, such as light filters. The number of components in this shading device make it relatively expensive to manufacture. Further, the bellows is only adjustable towards and away from the camera lens, making it limited in its versatility. If an extremely wide-angle shot is required, this device must be removed from the camera altogether since it cannot be retracted behind the field of view. Moreover, this device is adaptable to different diameter lenses only through use of replaceable adapters, further complicating the transportation and use of the device. These replaceable adapters are not designed for use with rectangular or square lens shapes. In addition, the bellows on this device is somewhat fragile, and in situations requiring a shading device of extreme strength or resilience, such as the filming of sporting events or exposure to extreme wind and weather conditions, this device is unsuitable.

Another lens shade device is made of flexible material and has the approximate shape of a hollow cylinder. This device is made entirely of pliable material into which are formed angular hinge sections. One drawback of this device is that it is adjustable only towards and away from the camera lens, making it limited in its versatility. Further, this device is not adaptable to different diameter lenses, and consequently a variety of sizes of this device must be available if the device is to be used on a variety of lens diameters. In addition, this device is not designed for use with rectangular or square lens shapes, and also prevents the lens cap of the camera or external filter elements from being used properly.

Our previous U.S. Pat. No. 5,101,298, issued on Mar. 31, 1992, and hereby incorporated with this application by reference, teaches a lens shade device that overcomes these drawbacks. However, our previous device has the disadvantage that light can enter the lens area from behind the camera when the side shade pieces are not at the pre-set angle shown in FIG. 2 of our previous patent. Often, however, the side shade pieces must be set at any of a wide variety of angles, thus limiting the use of this device. Further, the visor section of our previous device has laterally extending tips that are easily contacted by persons or scenery around the camera, and may be seen by the camera when the visor is at certain angles. Still further, we have found that the hinge sections of our previous device are prone to cracking or tearing. Thus, while other shading devices are available, none have been found that do not have some of the drawbacks mentioned above. Clearly, then, there is a need for a camera shade apparatus that overcomes these disadvantages. The present invention fulfills these needs and provides further related advantages.

SUMMARY OF THE INVENTION

The present invention is a shade apparatus firmly held by a flexible mounting band or other mechanical holding device that attaches around any camera shroud, monitor, lens, or teleprompter. The shade attaches to the mounting band, such as by DUAL LOCK (TM) surface fastening device by 3M company. The top shade section is adjustable over a range of angles with respect to the mounting band through a hinge section, and this angle can be fixed with a position locking device. In one embodiment, two side shade pieces attach through hinge portions to the left and right side of the top shade section. Both side shade pieces, mirror images of each other, are adjustable in angle with respect to the top shade section, and they can also be fixed in angle with a position locking device. A visor piece, also hingably attached to the top shade section, is included contiguous to the top shade section to provide further light screening versatility.

In operation, the top shade section is mounted at the top and just rearward of the camera lens. Each side shade piece is then adjusted so as to block light entering the camera lens from the sides and rear, and the top shade section and visor are adjusted as necessary so as to block light entering the camera lens from above. The shade position locking devices are used to fix the relative angular position of each shade piece. The visor piece is adjusted in a similar fashion.

Of importance is the means used for articulated movement between the various sections of the shade. The sections are attached to each other by continuous hinges formed of thinned sections of the sheet plastic. These hinges provide no gaps or openings for light to enter and are very easily bent for accommodation of a wide range of motion. The hinges are a "living hinge" formed as integral parts of the molded shade.

As the mounting band is made from a flexible material and can be of any length, it conforms to all shapes and sizes of current camera lens shrouds. In addition, as the top shade section is mounted just rearward of the lens shroud, any wide angle shot may be taken with the camera. Further, the lens cap and other external filter or effects elements may be securely positioned on the lens without interference from the shade device. This is especially beneficial for television cameras, as keeping the lens covered on such cameras helps to protect the expensive video tubes. Each shading piece is independent from the others so that the camera operator has complete flexibility in establishing a desired shade configuration. The shading pieces are made of a tough, durable, opaque material to withstand unexpected impact and extreme weather conditions. When the apparatus is disassembled it lies flat, conveniently wrapped with the mounting band for ease of storage.

The primary objectives of the present shading device are to provide an improved screening of rear and side directed light to improve camera optics in both studio and out of doors situations; to provide improved folding features so as to enable use of the device with a wider range of lenses; and to improve the durability of the integral hinges formed in the material. The advantages of the invention include, first, that the shade may be quickly mounted with its mounting band onto most camera lens shrouds. Therefore a single shade can be quickly transferred and, consequently, used with a variety of cameras, monitors, and the like. Second, no modification to the lens or lens shroud is required. Also, adjustable side sections allow the invention to fit all applications. Finally, the position locking features permit recurring use of the shade without re-adjustment. Other features and advantages of the present invention will become apparent from the following more detailed description, taken in conjunction with the accompanying drawings, which illustrate, by way of example, the principles of the invention.

DESCRIPTION OF THE DRAWINGS

The accompanying drawings illustrate the invention. In such drawings.

DETAILED DESCRIPTION OF THE PREFERRED EMBODIMENT

Figure 1:
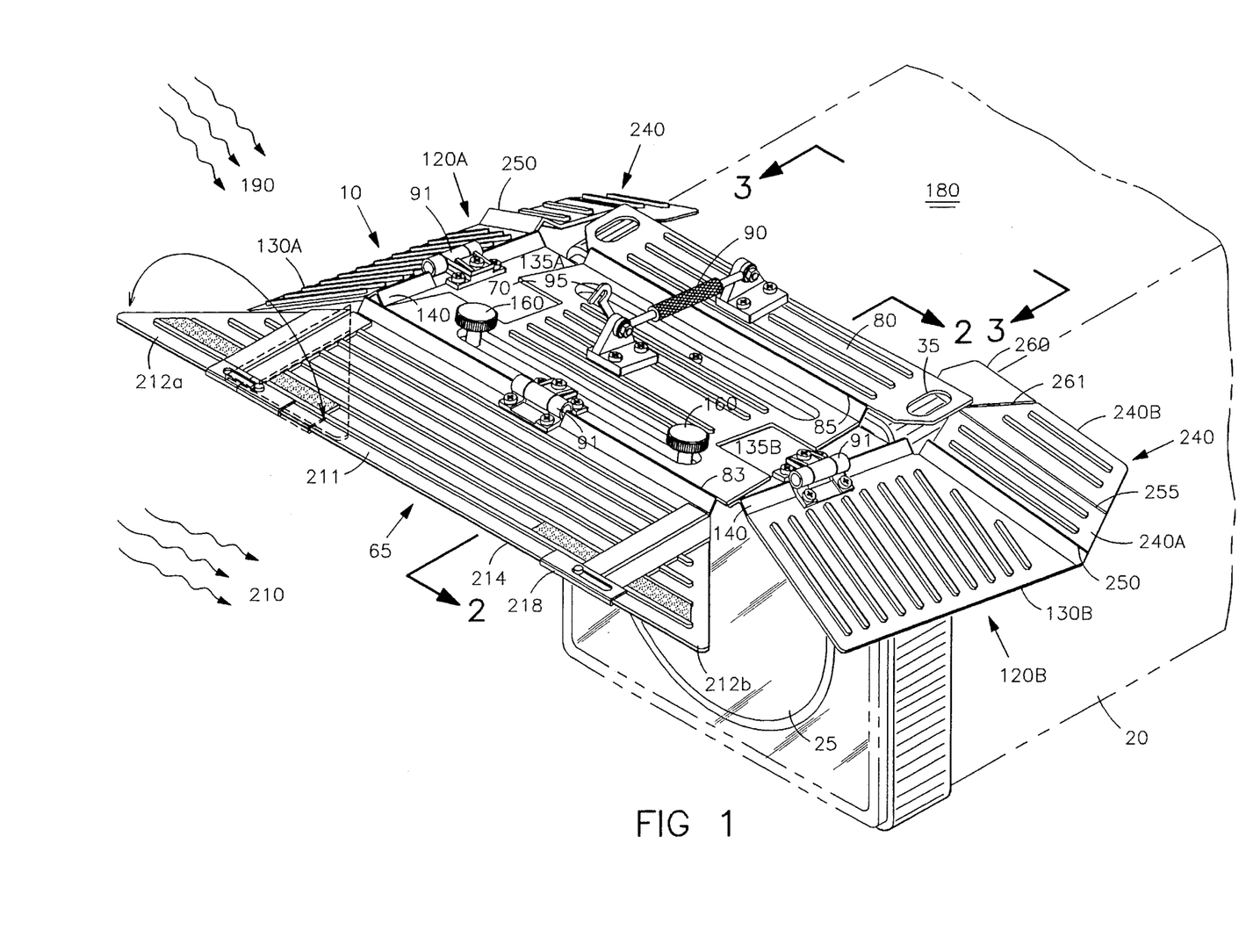
FIG. 1 is a perspective illustration of the invention illustrating a camera shade apparatus with a visor piece and two side shade pieces.
Figure 2A:
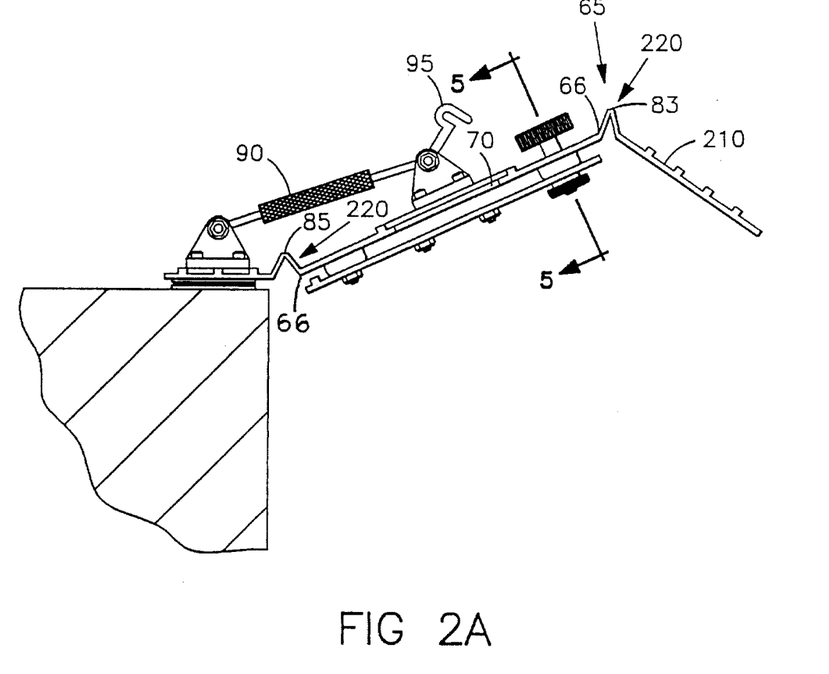
FIG. 2A is a cross-sectional right side elevational view of the invention taken generally along lines 2—2 of FIG. 1, illustrating the visor piece in an extended position and shown without the side shade pieces.
Figure 2B:
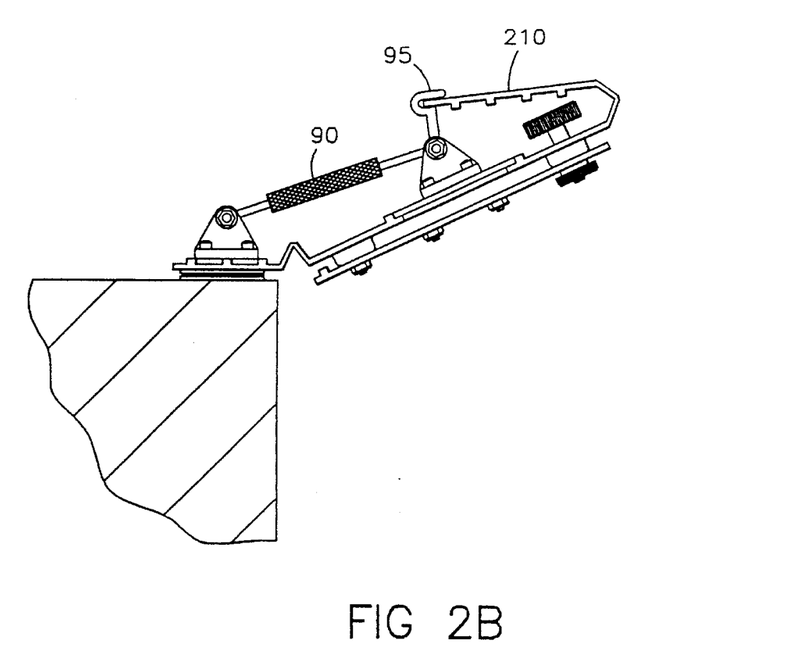
FIG. 2B is a cross-sectional right side elevational view of the invention taken generally along lines 2—2 of FIG. 1, illustrating the visor piece folded back and held by a latch device.

FIG. 1 shows a shade apparatus 10 formed of a plastic sheet stock material and adapted for mounting on a top horizontal surface 180 of a camera lens shroud 20 for screening a television camera lens 25 from direct or reflected light waves. A top shading piece 65 includes a planar, approximately rectangular top screening section 70 having two parallel, opposing sides 66, and a planar, isosceles trapezoid shaped visor section 210 (FIGS. 1 and 2A). The top shading piece 65 further includes an approximately rectangular top mounting section 80. The visor section 210 and the top mounting section 80 are attached to the screening section 70 along the opposing sides 66 respectively and joined integrally therewith by a first section 83 and a second section 85 of a hingable joint means 220, respectively. As such, the visor section 210 and the top mounting section 80 are each rotationally positionable over a range of angles relative to the screening section 70.

The top screening section 70 and the top mounting section 80 are further joined by a position adjustment and locking means 90 for temporarily setting an angle between these sections. The mounting section 80 has an apparatus attachment means 110 for mounting on the top horizontal surface 180 of the shroud 20 whereby the top screening section 70 and the visor section 210 extend cantilevered forward of, and above, the camera lens 25 for improved shading thereof.

Figure 4:
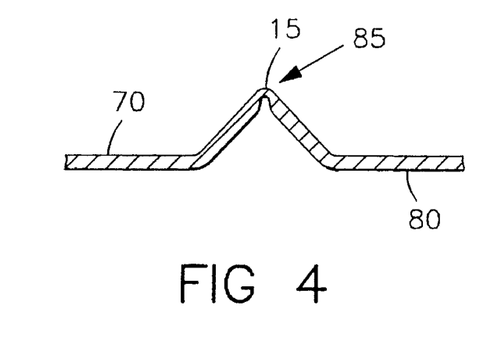
FIG. 4 is a partial cross-sectional view of the top shade piece of the invention of FIG. 1, illustrating a hingable joint means.
Figure 5:
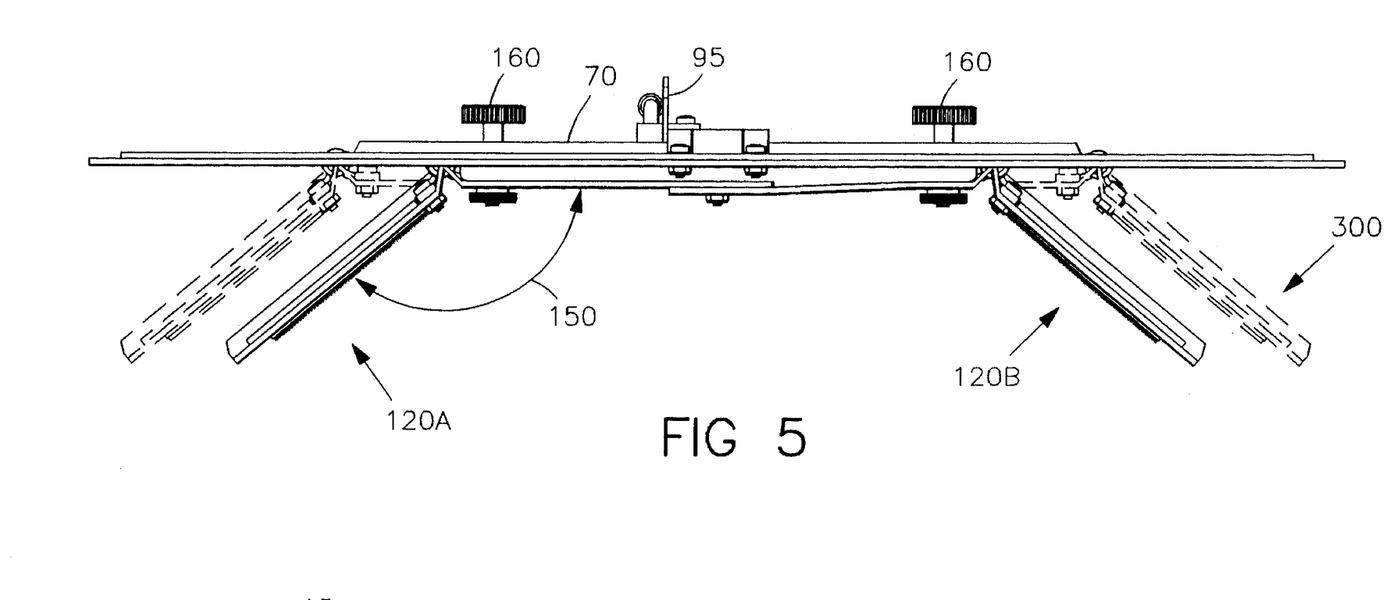
FIG. 5 is a cross-sectional view of the top piece of the invention, taken generally along lines 5—5 of FIG. 2.

The hingable joint means 220 is formed as an integrally molded linear portion 15 of the sheet stock material that is modified by local mechanical thinning to about 0.010 to 0.050 inches in high density polyethylene (FIG. 4). It has been found that by raising the temperature of the thinned section to approximately 150° to 200° F. while carefully working the hinge back and forth to stretch the plastic fibers therein, the hingable joint means 220 develops improved resiliency, flexibility, and resistance to cracking. This method of thinning and heat working has the advantage of providing the hingable joint means 220 with enough elasticity so as not to crack with repeated use, especially at extreme temperature, and also provides enough strength so as not to tear easily.

Figure 3:
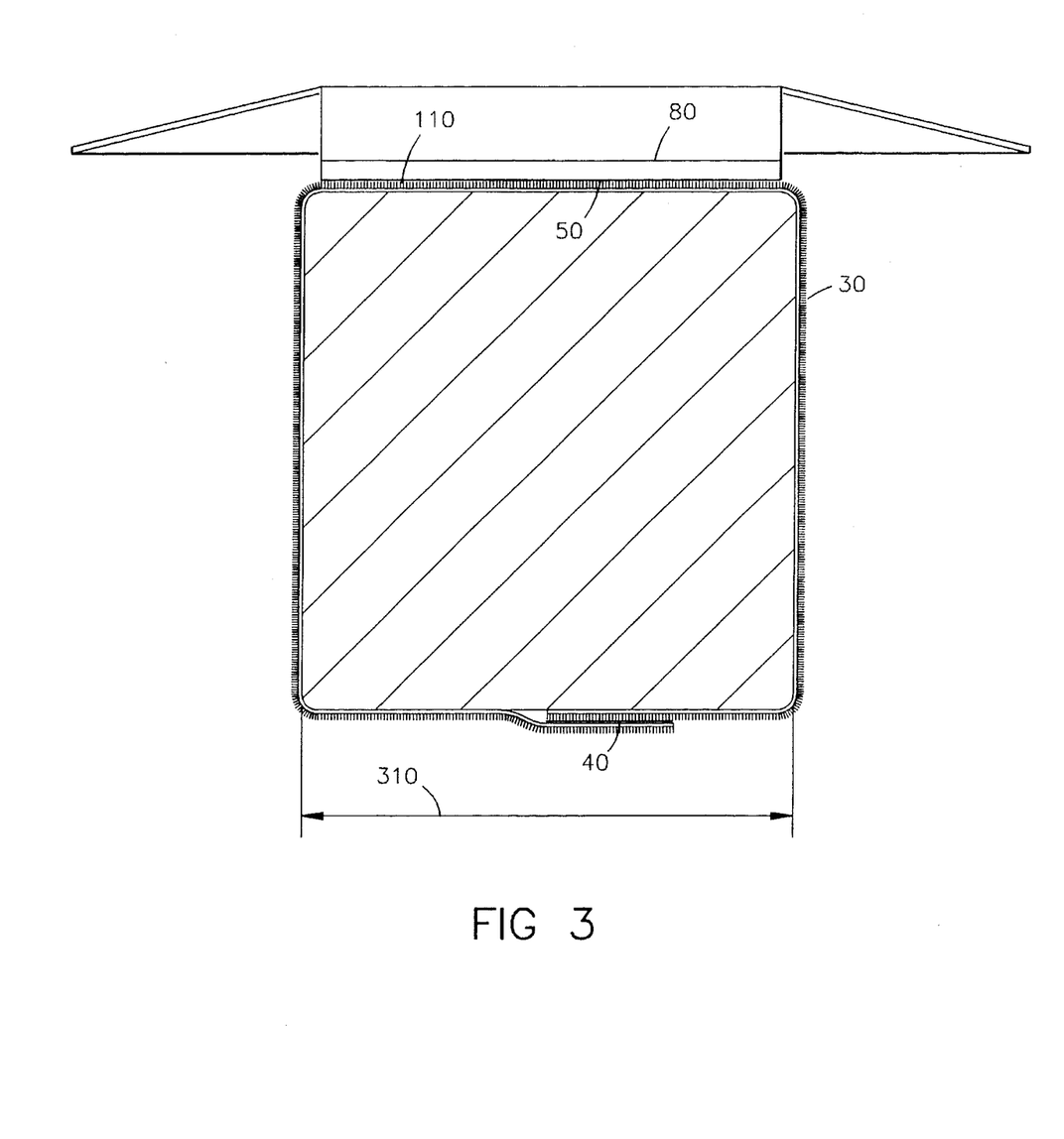
FIG. 3 is a cross-sectional rear elevational view of the invention taken generally along lines 3—3 of FIG. 1, shown without the side shade pieces.

At least one integrally formed aperture 35 is positioned in the top mounting section 80 for providing leverage in gripping the apparatus for disengaging the apparatus from the shroud 20. Preferably, the apparatus attachment means 110 includes a flexible mounting band 30 made from a loop-type fasting material. The apparatus attachment means 110 further includes a corresponding hook-type fastening material adhered to both the lens shroud 20 and the top mounting section 80 (FIG. 3).

A locking means 91 is attached to the visor section 210 and the top screening section 70 for temporarily fixing a selected angle of hingable adjustment therebetween. Such a locking means 91 is preferably a frictionally tight hinge arrangement with the capability of positive position locking. The locking means 91 may be complimented by a turnbuckle assembly 90 for more rigidly fixing the angle between the top mounting section 80 and the top screening section 70. The visor section 210 preferably further includes a rectangular main portion 211 hingably fixed to two triangular tip portions 212A,212B that are each positioned in lateral opposition on each side of the main portion 211. The tip portions 212A,212B are foldable so as to lay superimposed on top of the main portion 211 for improved clearance around the lens shroud 20, or alternately, to lay in coplanar orientation with the main portion 211 for extending shading.

The visor section 210 has a linear exterior edge 214, and, must further include adjacent to each of the tip portions 212A,212B a locking C-shaped sleeve 218 slidably engaged on the linear exterior edge 214 and positionable for locking the tip portion 212A,212B fixedly into coplanar orientation and, alternately, positionable for releasing the tip portion 212A,212B for folding into the superimposed position. Further, a holding means, such as a two-part fastening material, is included for holding the tip portion 212A,212B in the superimposed folded position.

The visor section 210 is foldable so as to overlay the top screening section 70. In such a position, the linear exterior edge 214, which is normally the front edge of the visor section 210, is directed toward the mounting section 80 to the rear. A latch means 95, such as the hook shown or its equivalent, is included on the top screening section 70 for holding the visor section in the overlaid position.

Figure 8:
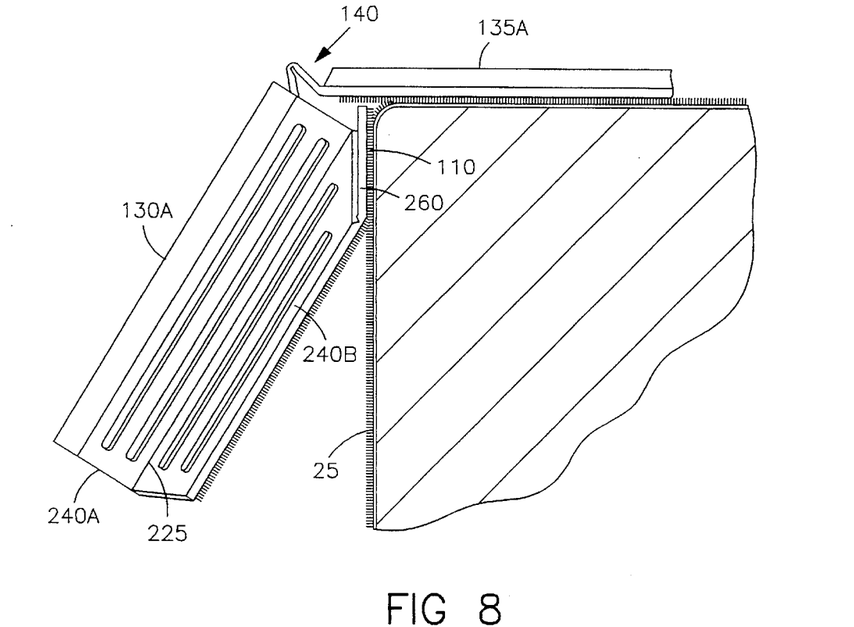
FIG. 8 is a partial rear elevational view of the left side of the invention, illustrating two portions of a rear-screening section of the side shade piece, with the side shade piece in a lowered position.
Figure 9:
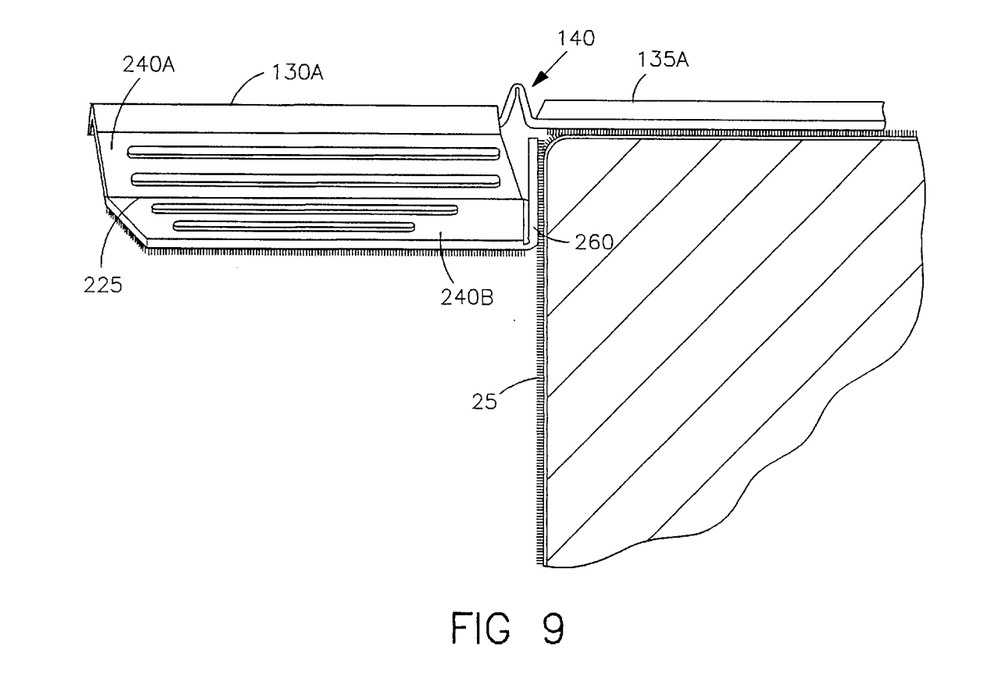
FIG. 9 is a partial rear elevational view of the left side of the invention, illustrating the two portions of the rear-screening section of the side shade piece, with the side shade piece in a raised, nearly horizontal position.

A pair of side shade pieces 120A,120B are further included and are slidably mounted to the top screening section 70 for positioning over a range of horizontal positions. Each side shade piece 120A,120B includes a side mounting section 135A,135B engaged with the top screening section 70 by a mounting means 160, such as a thumb knob arrangement. Further, each side shade piece 120A, 120B is interconnected by a third section 140 of the hingable joint means 220 to a side screening section 130A,130B that is positionable thereby over a range of orientations from horizontal to vertical. In the vertical orientation, each side screening section 130A,130B extends downwardly from the side mounting section 135A,135B, respectively. Each side screening section 130A,130B includes a rearwardly extending rear screening section 240 integrally formed and rotationally coupled with the side screening section 130A,130B by a fourth section 250 of the hingable joint means 220. Each rear screening section 240 is formed as two portions 240A,240B joined by a fifth section 255 of the hingable joint means 220 so that the rear screening section 240 is configurable and adaptable for a wide range of shading requirements by folding thereof (FIGS. 8 and 9).

Figures 6, 7:
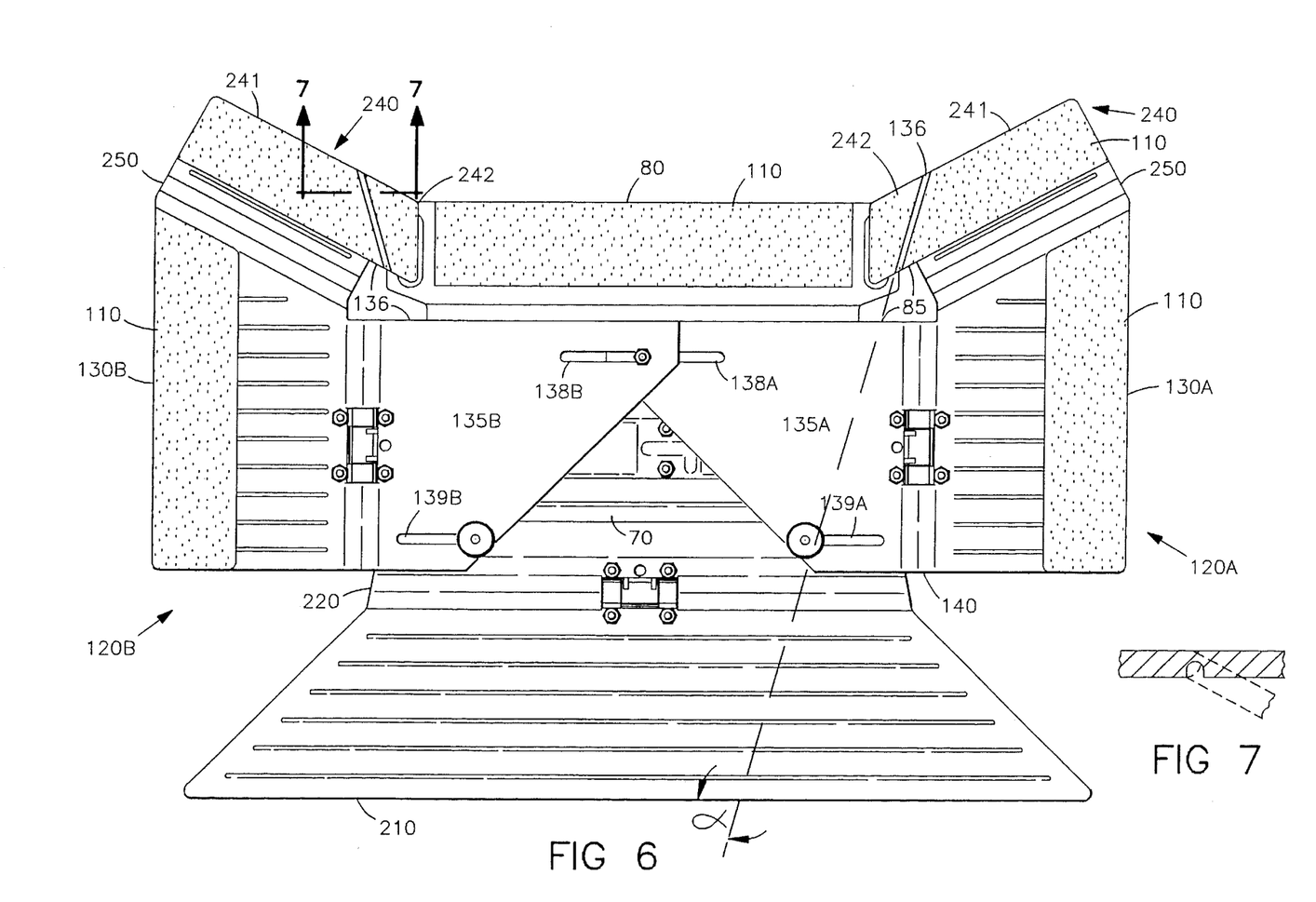
FIG. 6 is a bottom plan view of the invention.
FIG. 7 is a partial cross-sectional view of the invention, taken generally along lines 7—7 of FIG. 6, illustrating an alternate hingable joint means.

A rear mounting section 260 is rotatably attached to each rear screening section 240 by a sixth section 261 of the hingable joint means 220 at an angle α, relative to the exterior edge 214 of the visor section 210 of between approximately 45° and 60° measured with the top shading piece 65 and the side shading pieces 120A,120B fully assembled in operating positions and laid flat in a common plane (FIG. 6). A surface contact attachment means 110, such as a hook and loop type fastener or a low-tact adhesive, is included for attachment of the rear mounting section 260 to a side surface of the camera lens shroud 20 or, alternately, to a side portion of the mounting band 30. The relative positions of the side screening section 130A,130B, the rear screening section 240, and the two portions 240A,240B permit the rear mounting section 260 to be positioned in parallel plane alignment with the side surface of the lens shroud 20 through all alignment positions of the side screening section 130A,130B, from horizontal to near vertical.

As such, with the side screening sections 130A,130B in any non-vertical orientation, the rear screening section 240 is able to cover the open rearward path of light entering the lens area from behind. This is achieved by contacting the rear mounting section 260 to the side surface of the lens shroud 20, thereby blocking any rearwardly originating light from entering the lens area. The rear mounting section 260 may be repeatedly detached and re-attached to the side surface of the lens shroud 20, where necessary, depending upon the angle of the side shade pieces 130A,130B with respect to the top screening section 70 (FIGS. 8 and 9).

When the device is dismantled, the top screening section 70, the visor section 210, and each side shade piece 120A, 120B may be positioned to lie flat, generally parallel and in contact with each other. This configuration enables the device to be stored and transported with the lens 25 in a lens case for mobile television production.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A shade apparatus formed of a plastic sheet stock, and adapted for mounting on a top horizontal surface of a shroud of a television camera lens or teleprompter for screening a television camera lens from direct or reflected light rays, comprising:

a top shading piece including a planar, approximately rectangular top screening section having two parallel, opposing sides, a planar, isosceles trapezoid shaped visor section, and an approximately rectangular top mounting section, the visor and mounting sections attached to the screening section along opposing sides respectively and joined integrally therewith by a first and second sections of a hingable joint means respectively, such that the visor and the mounting sections are each rotationally positionable over a range of angles relative to the screening section;

the top screening and the mounting sections being further joined by a position adjustment and locking means for temporarily setting an angle therebetween, the mounting section having an apparatus attachment means for mounting on the surface of the shroud whereby the top screening section and the visor section extend cantilevered forward of, and above, the camera lens for improved shading thereof;

the hingable joint means formed as an integrally molded linear portion of the sheet stock modified by local mechanical thinning and heat working thereof to establish improved elasticity and durability for repeated flexing of the hingable joint means without cracking;

wherein the visor section includes a rectangular main portion, hingably fixed to two triangular tip portions positioned in lateral opposition on each side of the main portion, the tip portions being foldable to lay superimposed on the main portion for improved clearance around the camera lens, or alternately to lay in coplanar orientation with the main portion for extended shading;

wherein the visor section provides a linear exterior edge, and further including adjacent to each of the tip portions, a locking C-shaped sleeve slidably engaged on the linear exterior edge and positionable for locking the tip portion into said coplanar orientation and alternately positionable for releasing the tip portion for folding into the superimposed position, and further including holding means for holding the tip portion temporarily in the superimposed position.

2. The apparatus of claim 1 further including at least one integrally formed aperture positioned in the top mounting section lateral to the apparatus attachment means, providing leverage in gripping the apparatus for disengaging the apparatus from the shroud.

3. The apparatus of claim 1 further including a locking means attached to the visor section and the top screening section for temporarily fixing a selected angle of hingable adjustment therebetween.

4. A shade apparatus formed of a plastic sheet stock, and adapted for mounting on a top horizontal surface of a shroud of a television camera lens or teleprompter for screening a television camera lens from direct or reflected light rays, comprising:

a top shading piece including a planar, approximately rectangular top screening section having two parallel, opposing sides, a planar, isosceles trapezoid shaped visor section, and an approximately rectangular top mounting section, the visor and mounting sections attached to the screening section along opposing sides respectively and joined integrally therewith by a first and second sections of a hingable joint means respectively, such that the visor and the mounting sections are each rotationally positionable over a range of angles relative to the screening section;

the top screening and the mounting sections being further joined by a position adjustment and locking means for temporarily setting an angle therebetween, the mounting section having an apparatus attachment means for mounting on the surface of the shroud whereby the top screening section and the visor section extend cantilevered forward of, and above, the camera lens for improved shading thereof;

the hingable joint means formed as an integrally molded linear portion of the sheet stock modified by local mechanical thinning and heat working thereof to establish improved elasticity and durability for repeated flexing of the hingable joint means without cracking a pair of side shade pieces slidably mounted to the top shading piece for positioning over a range of horizontal positions, each including a side mounting section engaged with the top screening section, interconnected by a third section of the hingable joint means to a side screening section positionable thereby over a range of orientations from horizontal to vertical, the latter extending downwardly from the side mounting section, the side screening section including a rearwardly extending rear screening section integrally formed and rotationally coupled with the side screening section by a fourth section of the hingable joint means, the rear screening section being formed as two portions joined by a fifth section of the hingable joint means so that the rear screening section is configurable and adaptable for a wide range of shading requirements by folding thereof.

5. The apparatus of claim 4 further including a rear mounting section rotatably attached to the rear screening section by a sixth section of the hingable joint means at an angle relative to the exterior edge of the visor section of between approximately 45 and 60 degrees measured with the top and side shading pieces fully assembled in operating positions and laid flat in a common plane, and including a surface contact attachment means for attachment of the rear mounting section to a side surface of the camera lens shroud, the relative positions of the side screening section, rear screening section, including the two portions thereof, permitting the rear mounting section to be positioned in parallel plane alignment with the side surface of the camera shroud through all alignment positions of the side screening section from horizontal to near vertical and with the top screening section in a horizontal orientation or elevated orientation.

6. The apparatus of claim 4 further including at least one integrally formed aperture positioned in the top mounting section for providing leverage in gripping the apparatus for disengaging the apparatus from the shroud.

7. The apparatus of claim 4 further including a locking means attached to the visor section and the top screening section for temporarily fixing a selected angle of hingable adjustment therebetween.

* * * * *